(12) United States Patent
Cunningham

(10) Patent No.: US 8,778,034 B2
(45) Date of Patent: Jul. 15, 2014

(54) BIODEGRADABLE FUEL PERFORMANCE ADDITIVES

(75) Inventor: Lawrence J. Cunningham, Mechanicsville, VA (US)

(73) Assignee: Afton Chemical Corporation, Richmond, VA (US)

(*) Notice: Subject to any disclaimer, the term of this patent is extended or adjusted under 35 U.S.C. 154(b) by 2119 days.

(21) Appl. No.: 11/531,778

(22) Filed: Sep. 14, 2006

(65) Prior Publication Data

US 2008/0066377 A1 Mar. 20, 2008

(51) Int. Cl.
C10L 1/18 (2006.01)

(52) U.S. Cl.
USPC .......................................................... 44/385

(58) Field of Classification Search
USPC .......................................................... 44/385
See application file for complete search history.

(56) References Cited

U.S. PATENT DOCUMENTS

| | | | |
|---|---|---|---|
| 2,585,520 A | 2/1952 | Van Ess et al. | |
| 3,867,296 A | 2/1975 | Hunt | |
| 4,282,106 A * | 8/1981 | Schaap et al. ................ | 508/334 |
| 4,451,266 A | 5/1984 | Barclay et al. | |
| 4,575,382 A | 3/1986 | Sweeney et al. | |
| 5,215,548 A | 6/1993 | Ashcraft et al. | |
| 5,514,190 A | 5/1996 | Cunningham et al. | |
| 5,634,951 A | 6/1997 | Colucci et al. | |
| 5,697,988 A | 12/1997 | Malfer et al. | |
| 5,725,612 A | 3/1998 | Malfer et al. | |
| 5,876,468 A | 3/1999 | Moreton | |
| 5,944,858 A | 8/1999 | Wallace | |
| 5,997,593 A | 12/1999 | McDonnell et al. | |
| 6,048,373 A | 4/2000 | Malfer et al. | |
| 6,193,766 B1 | 2/2001 | Jordan | |
| 6,239,298 B1 | 5/2001 | Williamson et al. | |
| 6,383,992 B1 | 5/2002 | Garmier et al. | |
| 6,534,454 B1 | 3/2003 | Garmier et al. | |
| 7,141,083 B2 * | 11/2006 | Jordan ............................ | 44/307 |
| 2003/0140552 A1 | 7/2003 | Schwahn et al. | |
| 2005/0172546 A1 * | 8/2005 | Spivey et al. ................... | 44/412 |
| 2005/0241216 A1 | 11/2005 | Clark et al. | |
| 2007/0245621 A1 | 10/2007 | Malfer et al. | |
| 2008/0034647 A1 | 2/2008 | Cunningham et al. | |
| 2008/0066377 A1 * | 3/2008 | Cunningham .................. | 44/385 |

FOREIGN PATENT DOCUMENTS

| | | |
|---|---|---|
| CN | 1081465(A) | 2/1994 |
| CN | 1167136 A | 12/1997 |
| CN | 1245208 A | 2/2000 |
| CN | 1439045 A | 8/2003 |
| CN | 1775921 A | 5/2006 |
| CN | 1869176 A | 11/2006 |
| DE | 101 41 374 | 3/2003 |
| DE | 102 56 161 A1 | 6/2004 |
| EP | 0 578 495 | 1/1994 |
| EP | 0578495 A1 | 1/1994 |
| EP | 0 755 996 | 1/1997 |
| EP | 0 905 217 A1 | 3/1999 |
| EP | 1 081 209 A1 | 3/2001 |
| WO | WO99/61563 | 12/1999 |
| WO | 01/42399 A1 | 6/2001 |
| WO | WO01/77131 | 10/2002 |
| WO | 03/078553 A2 | 9/2003 |
| WO | 03/091364 A2 | 11/2003 |
| WO | WO2005/123238 | 12/2005 |
| WO | 2007/048553 A1 | 5/2007 |

OTHER PUBLICATIONS

Wong et al. (Journal of the American Oil Chemists' Society 2001; 78 (3): 311-318).*
Canadian Office Action dated Dec. 11, 2009.
Chinese Office Action dated Dec. 11, 2009.
AN 2005-215621, *Database WPI Week 200523*, Dec. 8, 2004 (Abstract of CN 1 552 827 A of China Petrochemical Corp.).
Allen A. Aradi et al., "The Effect of Fuel Composition and Engine Operating Parameters on Injector Deposits in a High-Pressure Direct Injection Gasoline (DIG) Research Engine," The Society of Automotive Engineers, Inc. Technical Paper 1999-01-3690, 1999, 11 pages.
Austrian Patent Office Written Opinion dated Feb. 15, 2008 for Singapore Application 200700933-5, 3 pages.
Austrian Patent Office Search Report and Written Opinion dated Apr. 11, 2008 for Singapore Application 200700933-5, 6 pages.
Belgian Search Report dated Feb. 12, 2009 for Belgian Application BE 2007/00089, non-English, 9 pages.
Austrian Patent Office Written Opinion dated Feb. 27, 2009 for Singapore Application 200700933-5, 5 pages.
European Patent Office Communication of a Notice of Opposition dated Nov. 24, 2009 and Notice of Opposition to European Patent EP 1 250 404 B1 by Lubrizol Limited, 225 pages.
State Intellectual Property Office of the Peoples Republic of China, First Office Action dated Jan. 8, 2010 for Chinese Patent Application 200710005119.8, 3 pages.

* cited by examiner

*Primary Examiner* — Shanon A Foley
(74) *Attorney, Agent, or Firm* — Fitch, Even, Tabin & Flannery LLP; Dennis Rainear

(57) ABSTRACT

There is disclosed a biodegradable fuel additive composition derived from at least one animal or plant source, and a fuel composition containing a biodegradable fuel additive composition derived from at least one animal or plant source useful for reducing the formation of engine deposits and for improving fuel economy of a vehicle combusting the fuel composition.

7 Claims, No Drawings

BIODEGRADABLE FUEL PERFORMANCE ADDITIVES

FIELD OF THE DISCLOSURE

The present teachings relates to partially biodegradable and biodegradable additives for gasoline and diesel to reduce the formation or presence of injector, valve and other engine deposits, to increase fuel economy and protect engines from wear. In particular, the present teachings provide in one embodiment partially biodegradable and biodegradable carrier fluids or oils and partially biodegradable and biodegradable detergents for use as gasoline and diesel fuel additives.

BACKGROUND OF THE DISCLOSURE

The use of bio-derived fuels as diesel fuel and gasoline blend components such as ethanol and biodiesel is known. However, a need exists for bio-derived and/or biodegradable or at least partially biodegradable fuel additives for gasoline and diesel fuel. A particular need exists for improved carrier fluids and detergents for gasoline and diesel fuel.

Fuel suppliers have begun to develop advanced biofuels with properties that can help overcome the limitations of existing biofuels. That work has now progressed to deliver advanced biofuels that can provide improved options for expanding energy supplies and accelerate the move to renewable transportation fuels.

Companies are leveraging biotechnology and bio-manufacturing capabilities with fuels technology expertise and market know-how. By pooling this knowledge and expertise, companies aim to improve the development and production of advanced biofuels, driving the growth of biofuels. Current projections show that biofuels and biodegradable fuel additives could become a significant part of the transport fuel mix in the future.

One of the first products to market was ethanol derived from grain and biodiesel consisting of fatty acid methyl esters from plant and animal sources. Advanced biofuels will likely be biobutanol as a gasoline bio-component. While existing biocomponents have proven to be an excellent starting point for the introduction of biofuels and biofuel additives and will continue to play a role in the future, there are issues that needed to be addressed to increase market penetration. In particular, compatibility with existing fuel supply and distribution systems, the ability to blend in higher concentrations without requiring vehicle modifications, and fuel economy were identified as areas where improvements are needed.

SUMMARY OF THE DISCLOSURE

The present teachings provide, in one embodiment, a carrier oil composition including a biodegradable carrier oil derived from at least one plant or animal source.

In another embodiment of the present teachings is provided a fuel detergent composition including a biodegradable detergent from at least one plant or animal source.

In another embodiment of the present teachings is provided a fuel detergent additive package including a biodegradable carrier oil derived from at least one plant or animal source, and a detergent comprising an amine-functionalized hydrocarbon-containing biodegradable carrier oil derived from at least one plant or animal source.

A further embodiment of the present teachings includes a gasoline or diesel fuel composition including a gasoline fuel, a detergent, and at least one biodegradable carrier oil derived from at least one plant or animal source.

A further embodiment of the present teachings includes a gasoline or diesel composition including a fuel, a biodegradable detergent derived from at least one plant or animal source and optionally a carrier oil.

An additional embodiment of the present teachings provides a method of reducing the formation of engine deposits in an engine combusting a fuel, such as gasoline or diesel fuel, the method including combusting in an engine a fuel composition which has a major amount of a fuel with component boiling points ranging from 15 degrees C. to 400 degrees C., a detergent selected from succinimides, Mannichs, and polyetheramines, and at least one carrier oil derived from at least one plant or animal source. Other embodiments include methods wherein the fuel has boiling point ranges from 15 degrees C. to 225 degrees C., and further embodiments have fuels with boiling ranges from 150 degrees C. to 400 degrees C.

In accordance with the present teachings, the plant source from which the carrier oil is derived can include an extract from at least one plant source selected from for example and not as a limitation herein the group consisting of vetch, fescue, clover, oats, rye, rice, hops, barley, alfalfa, legumes, sugar beets, corn grain, wheat, potatoes, carrots, sugarcane, sorghum, corn stalks, soy bean oil, castor oil, rape seed, jojoba, switchgrass, field grass, and seaweed and mixtures thereof and other biomass sources. Examples of suitable animal sources can include at least one animal source selected from the group consisting of animal fats, tallow, lard, yellow grease, and fish oil and mixtures thereof.

By the present teachings engine deposits, injector deposits, both direct and indirect, intake valve deposits ("IVD") and combustion chamber deposits ("CCD"), will be reduced and/or prevented upon the combustion of a fuels such as gasoline and diesel fuel containing the biodegradable or partially biodegradable fuel additive carrier fluid and/or the biodegradable or partially biodegradable detergent. A further benefit of the practice of the present teachings is, in one embodiment, an increase in a vehicle's fuel economy. A further benefit of the present teachings is, in one embodiment, an improvement or enhancement in the friction properties within the combustion engine due to the presence of the carrier fluid and/or detergent and its lubricating capacity. A further benefit of the present teachings is, in one embodiment, an improvement or enhancement in the low temperature viscometric performance and the resulting reduction in valve sticking due to the presence in the fuel of the biodegradable carrier fluid and/or biodegradable detergent.

Additional objects and advantages of the teachings will be set forth in part in the description which follows, and/or can be learned by practice of the teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the teachings, as claimed.

DESCRIPTION OF THE EMBODIMENTS

In one aspect of the present teachings, a hydrocarbon-containing biodegradable carrier oil derived from at least one plant or animal source is provided and may be further characterized by having properties such as:

Deposit Weight % ≤5% (by the Penn State Microoxidation Test*)
Knoack Volatility ≤50 wt. %
Pour Point ≤0° C.

Viscosity Index ≥85
Viscosity (100° C.) ≤125 cSt
Sulfur ≤50 ppm

*The Penn State Microoxidation Test is described in Society of Automotive Engineers Technical Paper 87028

The Knoack volatility of the carrier oil can range from less than about 50 wt. % to more than about 5 wt. %, or from less than about 35 wt. % to more than about 20 wt. %. The pour point of the carrier oil can in one embodiment range from about 0° C. to about −15° C., or in another embodiment from about 0° C. to about −35° C. The viscosity at 100° C. of the carrier oil can range from about 125 cSt to about 5 cSt, or in another embodiment from about 75 cSt to about 10 cSt. The sulfur concentration of the carrier oil is not a limitation herein but can in one embodiment herein range from about 5 ppm to about 500 ppm, or from about 10 ppm to about 200 ppm. The final sulfur content in the finished fuel will be determined by other sources of sulfur and by the treat rate of the carrier fluid. The viscosity of the carriers referred to herein is their viscosities in their undiluted state, i.e., prior to mixing with or addition to any other fuel component. The Penn State Micro Oxidation Test deposit weight will be range from about 0% and 5% or in another embodiment between 0.5% and 2.5%.

In some embodiments of the present teachings, the average molecular weight of the carriers can be in the range of from about 500 to about 3000, in another embodiment from about 750 to about 2500, and in yet another from above about 1000 to about 2000.

The plant source from which the carrier oil is derived can include at least one plant source selected from for example and not as a limitation herein the group consisting of vetch, fescue, clover, oats, rye, rice, hops, barley, alfalfa, legumes, sugar beets, corn grain, wheat, potatoes, carrots, sugarcane, palm, palm kernel, canola, jatropha, sorghum, corn stalks, soy bean oil, castor oil, rape seed, jojoba, switchgrass, field grass, seaweed, other biomass sources and mixtures thereof. Examples of suitable animal sources can include at least one animal source selected from the group consisting of animal fats, tallow, lard, yellow grease, and fish oil and mixtures thereof.

The oil from the plant or animal source according to the present teachings can undergo a chemical process prior to use in or as a carrier oil composition. For instance, the oil derived from at least one plant or animal source can undergo at least one treatment selected from the group consisting of hydrogenation, partial hydrogenation, esterification and functionalization of carbon-carbon double bonds. The carrier fluid may also be aminated by any of several processes known in the art to improve the effectiveness of the bio derived material.

The raw material from the plant or animal source may be susceptible to oxidation arising from the presence of numerous double bonds, especially allylic bonds. Hydrogenation or functionalization of the double bonds can render the raw material from the plant or animal source more suitable for use as a carrier oil. Additionally, the concentration of hydroxyl groups in the plant or animal derived raw material may be unsuitable for use as a carrier oil and may, in some cases, be modified to more suitable levels by hydrogenation or functionalization. The functionalization process can include, for instance, esterification, amination, epoxidation, and so forth. One of ordinary skill in the art can select the desired properties of the derived carrier oil and/or detergent and choose the modification route to obtain the desired end product.

In some embodiments of the present teachings, the carrier oil can be partially biodegradable. While a fully biodegradable carrier oil is to be presented in one embodiment, a trade-off can be made between the required chemical or physical properties of the carrier oil and its biodegradability.

Another embodiment of the present teachings provides a fuel detergent additive package including a biodegradable carrier oil derived from at least one plant or animal source, and a detergent comprising an amine-functionalized hydrocarbon-containing biodegradable carrier oil derived from at least one plant or animal source. In this embodiment, the detergent is attached to, pendant on or derived from a biodegradable carrier oil derived from at least one plant or animal source. The hydrocarbon-containing biodegradable carrier oil derived from at least one plant or animal source can be the same or different for each component of the fuel detergent additive package to which it is attached. Other additives may be included within the fuel compositions and fuel additive compositions of this invention provided they do not adversely affect the engine oil properties achievable by the practice of this invention. Thus use may be made in the fuel additive or the fuel composition of such components as organic peroxy esters, corrosion inhibitors, antioxidants, anti-rust agents, detergents and dispersants, lubricity agents, demulsifiers, dyes, pour point depressants, cold flow improvers, inert diluents, and like materials, as well as a manganese source or other metal-containing ignition improvers.

The carrier oil component of the fuel detergent additive package can in one embodiment and not as a limitation herein have a Knoack volatility of less than or equal to about 50 wt. %, a pour point of less than or equal to about 0° C., and a viscosity index or greater than or equal to 85, a sulfur concentration of less than or equal to about 50 ppm and a Penn State Micro Oxidation Test deposit weight of less than or equal to 5%. The carrier oil can alternatively have one or more of these properties present at the indicated levels, independently of the other properties.

In some embodiments of the fuel detergent additive package, the plant and animal source for the carrier oil can include at least one plant or animal source selected from the same group of plant and animal sources set forth hereinabove.

The detergent and the carrier oil can in one embodiment be combined at a weight ratio ranging from about 1:4 to about 4:1. A range of weight ratios of particular interest includes ratios ranging from about 1:100 to about 100:1. The detergent and carrier proportions are based on neat carrier and detergent, that is not diluted with solvent.

In some embodiments of the fuel detergent additive package according to the present teachings, the hydrocarbon-containing biodegradable carrier oil can be an oil derived from at least one plant or animal source. The oil can undergo at least one chemical treatment selected from the group consisting of hydrogenation, partial hydrogenation, esterification and functionalization of carbon-carbon double bonds. The reaction or treatment and the extensiveness of the treatment can be selected to obtain an oil with the desired properties for use as a carrier oil in the fuel additive package of the present teachings.

The detergent of the fuel detergent additive package can include an amine-functionalized hydrocarbon-containing biodegradable carrier oil derived from at least one plant or animal source. In some embodiments of the fuel detergent additive package, the hydrocarbon-containing biodegradable carrier oil derived from at least one plant or animal source used to produce the detergent can be the same hydrocarbon-containing biodegradable carrier oil derived from at least one plant or animal source used as the carrier oil.

The modification of the hydrocarbon-containing biodegradable carrier oil derived from at least one plant or animal source into the detergent of the fuel detergent additive package can also include, in addition to amination, cyano alkylation followed by reduction to obtain an amine-functionalized hydrocarbon-containing compound with the desired levels of detergent properties.

Various types of detergents singularly, or in combination, are suitable for use in the present teachings, and the practice of these teachings extends to all compounds suitable for improving the minimizing undesirable precipitation and deposit formation.

The detergent or dispersants utilized pursuant to the present teachings are fuel-soluble detergents including fuel-soluble salts, amides, imides, oxazolines and esters, or mixtures thereof of long chain aliphatic hydrocarbon-substituted dicarboxylic acids or their anhydrides; polyetheramines; long chain aliphatic hydrocarbons having an amine or a polyamine attached directly thereto; and Mannich condensation products formed by condensing a long chain aliphatic hydrocarbon-substituted phenol or cresol with an aldehyde, preferably formaldehyde, and a monoamine or a polyamine.

In some embodiments, the detergent is derived from at least one plant or animal source which has undergone amination to form an amine, which can also be a polyamine. The amines can contain at least one amino group having at least one active hydrogen atom. Preferably, the component derived from the plant or animal source will have an aliphatic chain (saturated or olefinically unsaturated) which contains an average of at least about 10, preferably at least about 15, and more preferably at least about 17 carbon atoms to provide the fuel solubility and stability required to function effectively as a detergent.

Another embodiment of the present teachings includes a gasoline composition having a gasoline fuel, a detergent, and at least one biodegradable carrier oil derived from at least one plant or animal source.

The carrier oil component of the gasoline composition can have a Knoack volatility of less than or equal to about 50 wt. %, a pour point of less than or equal to about 0° C., a viscosity index of greater than or equal to about 85, a sulfur concentration of less than or equal to about 50 ppm and a micro oxidation deposit weight (Penn State Micro Oxidation Test) of less than or equal to 5%. The carrier oil can have one or more of these properties present at the indicated levels, independently of the other properties.

In the gasoline composition according to the present teachings, the detergent can be at least one member selected from the group consisting of polyamines, polyetheramines, succinimides, succinamides, aliphatic polyamines, and Mannich detergents.

The gasoline composition according to the present teachings can further include embodiments wherein the fuel is a biofuel, such as, for example, ethanol and/or biobutanol.

In some embodiments of the fuel composition, the fuel can include from about 50 to about 99.999 wt. % gasoline fuel, from about 0.001 to about 3.0 wt. % detergent, and from about 0.001 to about 3.0 wt. % carrier oil derived from at least one plant or animal source.

Another embodiment of the present teachings includes a method of reducing the formation of engine deposits in an engine combusting a fuel by combusting in an engine a fuel composition including a major amount of a fuel with a boiling point of from about 15 degrees C. to about 225 degrees C., a detergent, and at least one carrier oil derived from at least one plant or animal source. One fuel utilized in the method can be or comprise gasoline.

Another embodiment of the present teachings includes a method of reducing the formation of engine deposits in an engine combusting a fuel by combusting in the engine a fuel composition including but not limited to a major amount of a fuel with a boiling point of from about 150 degree C. to about 400 degree C., and a biodegradable or partially biodegradable detergent derived from at least one plant or animal source. One fuel utilized in the method can be or comprise diesel fuel.

In the method to reduce the formation of engine deposits according to the present teachings, the carrier oil can be derived from the plant and animal sources set forth hereinabove.

The carrier oil component of the fuel composition utilized in the presently taught method can in one example have a Knoack volatility of less than or equal to about 50 wt. %, a pour point of less than or equal to about 0° C., a viscosity index of greater than or equal to about 85, a sulfur concentration of less than or equal to about 50 ppm and a Penn State Micro Oxidation Test deposit weight of less than or equal to 5%. The carrier oil can have one or more of these properties present at the indicated levels, independently of the other properties.

In some embodiments of the engine deposit reduction method, the detergent can be at least one member selected from the group consisting of polyamines, polyetheramines, succinimides, succinamides, aliphatic polyamines, and Mannich detergents.

In some embodiments of the engine deposit reduction method, the base fuel can be a biofuel, for instance ethanol and/or biobutanol. In other embodiments, the base fuel can be gasoline, or a mixture or blend of gasoline and biofuels.

In some embodiments of the present teachings, the base fuel used in formulating the fuel compositions can include any base fuel suitable for use in the operation of spark-ignition internal combustion engines such as leaded or unleaded motor and aviation gasolines, and so-called reformulated gasolines which typically contain both hydrocarbons of the gasoline boiling range and fuel-soluble oxygenated blending agents ("oxygenates"), such as alcohols, ethers and other suitable oxygen-containing organic compounds. The fuel to which carrier oil is present preferably can be a mixture of hydrocarbons boiling in the gasoline boiling range. The fuel can consist of straight chain or branch chain paraffins, cyclo-paraffins, olefins, aromatic hydrocarbons or any mixture of these. The gasoline can be derived from straight run naptha, polymer gasoline, natural gasoline, catalytically cracked gasoline, alkylate or from catalytically reformed stocks and other refinery or chemical stocks boiling in the range from about 15 degree C. to about 225 degree C. The octane level, vapor pressure and chemical composition of the gasoline is not critical and any conventional gasoline, reformulated gasoline or boutique gasoline may be employed as a base fuel including gasoline with sulfur levels up to 2000 ppm and as low as 2 ppm.

Oxygenates suitable for use can include, but are not limited to methanol, ethanol, n-propanol, isopropanol, n-butanol, isobutanol, t-butanol, mixed C1 to C5 alcohols, methyl tertiary butyl ether, tertiary amyl methylether, ethyl tertiary butyl ether and mixed ethers. Oxygenates, when present, can be present in the base fuel in an amount below about 30% by volume, and preferably in an amount that provides an oxygen content in the overall fuel in the range of about 0.5 to about 5 percent by volume.

Alternative fuels can also be used, including 100% ethanol, hydrated ethanol, and 70%-85% ethanol known as E85.

In additional embodiments of the present teaching, the base fuel used in formulating the fuel composition can include any base fuel suitable for use in the operation of compression ignition internal combustion engines such as on-road and off road, stationary, marine and locomotive diesel engines, including diesel engines used for power generation or other non-vehicular applications such as diesel powered mining equipment. The fuel can comprise or consist of straight chain or branch chain paraffins, cycloparaffins, olefins, aromatic hydrocarbons or any mixture of these. The diesel fuel can be derived from straight run diesel, catalytically cracked light cycle oil, kerosene, gas to liquids, coal to liquids, biomass to liquids and other refinery or chemical stocks boiling in the range from about 150 degree C. to about 400 degree C. Other bioderived blend stocks may also be included in the fuel such as, but not limited to fatty acid esters for example fatty acid methyl esters derived from plant and or animal sources. The cetane level and chemical composition of the diesel fuel is not critical and any combustible liquid boiling in the range from about 150 degree C. to about 400 degree C. may be employed as a base fuel.

In some embodiments of the presently taught fuel additives and fuel compositions, supplemental additives can be present along with the carrier oil(s) and detergents described herein. Examples of the supplemental additives can include additional carrier oils, dispersants/detergents, antioxidants, metal deactivators, dyes, markers, corrosion inhibitors, biocides, antistatic additives, drag reducing agents, demulsifiers, dehazers, anti-icing additives, antiknock additives, anti-valve-seat recession additives, cold flow improvers, pour point depressants, lubricity additives, friction improving additives, fuel economy additives, octane improvers, cetane improvers, combustion improvers and other similar additives along with other additives found in gasoline or that may carry over from processing, storing or distributing the fuel.

The additives used in formulating the fuels containing the carrier oils and detergents as presently taught can be blended into the base fuel individually or in various sub-combinations. Preferably, all of the components are blended concurrently into an additive concentrate as this takes advantage of the mutual compatibility afforded by the combination of ingredients, and also reduces blending time and lessens the possibility of blending errors.

Methods for the use of the compositions of the present teachings can include methods to reduce the formation of engine deposits (so called "keep clean") and methods to reduce the presence of engine deposits (so called "clean up"), and methods to increase fuel economy.

The present teachings relate to compositions having, and methods using, biodegradable and partially biodegradable oils derived from plant and/or animal sources, as carriers for detergents and other additives in fuels. As such, the present teachings are directed toward compositions, uses, systems, and methods incorporating these biodegradable and partially biodegradable oils to reduce or eliminate fuel injector, valve and combustion chamber deposits. More particularly, the teachings relate to fuel compositions comprising a fuel, a carrier oil, and a detergent, and the use of the fuel compositions in various internal combustion systems. By "combustion system" herein is meant, internal combustion engines, for example and not by limitation herein, Atkinson cycle engines, rotary engines, spray guided, wall guided, and the combined wall/spray guided direct injection gasoline ("DIG") engines, turbocharged DIG engines, supercharged DIG engines, homogeneous combustion DIG engines, homogeneous/stratified DIG engines, DIG engines outfitted with piezoinjectors with capability of multiple fuel pulses per injection, DIG engines with EGR, DIG engines with a lean-NOx trap, DIG engines with a lean-NOx catalyst, DIG engines with SN-CR NOx control, DIG engines with exhaust diesel fuel after-injection (post combustion) for NOx control, DIG engines outfitted for flex fuel operation (for example, gasoline, ethanol, methanol, biofuels, synthetic fuels, natural gas, liquefied petroleum gas (LPG), and mixtures thereof.) Also included are conventional and advanced port-fueled internal combustion engines, with and without advanced exhaust after-treatment systems capability, with and without turbochargers, with and without superchargers, with and without combined supercharger/turbocharger, with and without on-board capability to deliver additive for combustion and emissions improvements, and with and without variable valve timing. Further included are gasoline fueled homogeneous charge compression ignition (HCCI) engines, diesel HCCI engines, two-stroke engines, diesel fuel engines, gasoline fuel engines, stationary generators, gasoline and diesel HCCI, supercharged, turbocharged, gasoline and diesel direct injection engines, engines capably of variable valve timing, lean-burn engines, engines capable of inactivating cylinders or any other internal combustion engine. Still further examples of combustion systems include any of the above-listed systems combined in a hybrid vehicle with an electric motor.

According to the present teachings, it is particularly unexpected that a biodegradable or partially biodegradable carrier oil or detergent derived from at least one plant or animal source would actually decrease and not increase the deposits formed in an internal combustion engine.

As used herein, the term "biofuel" is used in its ordinary sense, which is well-known to those skilled in the art. Specifically, it refers to a fuel produced from the oils or other combustible portions of a once living species, including those of both of the plant and animal kingdoms. Examples of these include: traditional harvest crops, oil-producing plants, animals and animal parts, and the like. "Biofuel" here also includes the fuel such organic materials as "biobutanol", ethanol and "bioethanol", other alcohols and mixed alcohols, hydrocarbons and distillate fractions from the distillation of biofuels. Other examples of biofuels are fatty acid esters of derived from plant or animal sources By "biodegradable" herein is meant the susceptibility of a substance to decomposition by microorganisms, that is, the rate at which compounds may be chemically broken down by bacteria and/or other natural environmental factors.

By "partially biodegradable" herein is meant decomposition by microorganisms or a chemical break down which is between at least about 30% and less than about 90% complete.

By "carrier oil" herein is meant a material that aids in the dispersal of an additive for fuel into a fuel by either suspension or dissolution of the additive into the fuel. By "carrier oil" and/or "carrier fluid" herein is also meant any oil or fluid that provides a fluidizing property to the fuel, or an ability to "carry" or transport additives within a fuel, and/or provide a functionality beyond mere dilution.

By "detergent" herein is meant compounds having the ability to solubilize elements or compounds that would result in the formation of deposits and/or undesirable compounds in fuel or in an engine and its components.

All publications, articles, papers, patents, patent publications, and other references cited herein are hereby incorporated by reference in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Five test samples can be prepared in which the base fuel (Colonial Pipeline "P/L" fuel) will be tested alone, and with four combinations of detergents and carriers, as provided in Table 1. Measurements of intake valve deposit formation will be obtained utilizing the ASTM D-6201 test. This test will evaluate intake valve deposit formation of unleaded spark-ignition engine fuels utilizing a Ford 2.3 in-line, four cylinder engine.

The carriers will be tested to demonstrate the benefits of the present teachings. Comparisons will be made between a prior art mineral oil carrier (500 N), two hydrocarbon-containing biodegradable carrier oils derived from at least one plant or animal source as presently taught (CO-001, a soy bean oil and CO-002, a jojoba oil), and two detergents (D-001, a polyisobutenyl succinimide made from 950 MW polyisobutene, maleic anhydride and tetraethylene pentamine) and D-002, a Mannich obtained from the reaction of a cresol, 950 MW polyisobutene, formaldehyde and a polyamine). The weight ratio of detergent to carrier will be 1:1, and the base fuel will be Colonial Pipeline "P/L" Fuel, whose properties are described below.

| Test Description | Final Result | ASTM Test Method |
|---|---|---|
| Properties of Tested Fuel (Colonial Pipeline "P/L" Fuel): | | |
| API Gravity (@ 60° F.) | 60.6 | D-4052 |
| Distillation, Gasoline (° F.) | | D-86 |
| Initial Boiling Point | 84.9 | |
| 05% Evaporated Temperature | 100.1 | |
| 10% Evaporated Temperature | 113.3 | |
| 20% Evaporated Temperature | 133.4 | |
| 30% Evaporated Temperature | 155.1 | |
| 40% Evaporated Temperature | 180.5 | |
| 50% Evaporated Temperature | 207.1 | |
| 60% Evaporated Temperature | 233.0 | |
| 70% Evaporated Temperature | 259.9 | |
| 80% Evaporated Temperature | 293.5 | |
| 90% Evaporated Temperature | 339.0 | |
| 95% Evaporated Temperature | 372.5 | |
| Final Boiling Point | 437.5 | |
| Recovery (Vol %) | 95.8 | |
| Residue (Vol %) | 1.2 | |
| Loss (Vol %) | 3.0 | |
| Hydrocarbon Type - FIA | | |
| Aromatics (LV %) | 26.0 | D1319 |
| Olefins (LV %) | 12.6 | |
| Saturates (LV %) | 61.4 | |
| FUEL ANALYTICAL REPORT: | | |
| Induction Period (min) | 960+ | D-525 |
| Octane | | |
| Research Octane | 91.5 | D-2699 |
| Motor Octane | 82.6 | D-2700 |
| R + M/2 | 87.0 | |

TABLE 2

DEPOSIT FORMATION MEASUREMENTS
Engine Test Results (ASTM D - 6201, Ford 2.3 liter engine)

| Base Fuel | Detergent | Carrier | Ratio | Avg. IVD (mg/valve) | Avg. CCD (mg/cylinder) |
|---|---|---|---|---|---|
| Colonial P/L (A) | None | 500 N(1) | None | 415.6 | 1298 |
| Colonial P/L (A) | None | CO-001(2) | None | <415 | <1298 |
| Colonial P/L (A) | None | CO-002(2) | None | <415 | <1298 |
| Colonial P/L (A) | D-001 | CO-001(2) | 1/1 | <415 | <1298 |
| Colonial P/L (A) | D-002 | CO-001(2) | 1/1 | <415 | <1298 |

(1) a standard mineral oil carrier
(2) a presently taught biodegradable hydrocarbon oil carrier As demonstrated in Table 2, the accumulation of intake valve deposits (IVD) and combustion chamber deposits (CCD) is expected to be reduced by use of the presently taught biodegradable carrier oil. In addition, the accumulation of intake valve deposits (IVD) and combustion chamber deposits (CCD) is expected to be reduced by use of the presently taught biodegradable carrier oil along with detergents derived from the presently taught biodegradable carrier oil.

What is claimed is:

1. A fuel detergent additive package for use in a fuel to reduce intake valve deposit formation and combustion chamber deposit formation comprising
    a biodegradable carrier oil derived from at least one plant source which undergoes at least hydrogenation such that the biodegradable carrier oil has a noack volatility of less than or equal to about 50 wt. %, a pour point of less than or equal to about 0° C., a viscosity index of greater than or equal to about 85, a sulfur concentration of less than or equal to about 50 ppm, and a Penn State Microoxidation deposit weight of less than 5%,
    a detergent comprising at least one member selected from the group consisting of (i) fuel-soluble salts, amides, imides, oxazolines and esters, or mixtures thereof of long chain aliphatic hydrocarbon-substituted dicarboxylic acids or their anhydrides; (ii) polyetheramines; (iii) long chain aliphatic hydrocarbons having an amine or a polyamine attached directly thereto; and (iv) Mannich condensation products formed by condensing a long chain aliphatic hydrocarbon-substituted phenol or cresol with an aldehyde, and an amine; and
    wherein the plant source comprises at least one plant source selected from the group consisting of corn grain, palm, canola, jatropha, soy bean oil, castor oil, rape seed, jojoba, and mixtures thereof.

2. The fuel detergent additive package according to claim 1, wherein the detergent and the carrier oil are combined at a ratio ranging from about 1:4 to about 4:1.

3. A fuel detergent additive package for use in a fuel to reduce intake valve deposit formation and combustion chamber deposit formation comprising
    a biodegradable carrier oil derived from at least one plant source which undergoes at least one treatment selected from the group consisting of hydrogenation, partial hydrogenation, esterification and functionalization of carbon-carbon double bonds so that the biodegradable carrier oil has a noack volatility of less than or equal to about 50 wt. %, a pour point of less than or equal to about 0° C., a viscosity index of greater than or equal to about 85, a sulfur concentration of less than or equal to about 50 ppm, and a Penn State Microoxidation deposit weight of less than 5%, a detergent not derived from at least one plant or animal source; and wherein the plant source comprises at least one plant source selected from the group consisting of corn grain, palm, canola, jatropha, soy bean oil, castor oil, rape seed, jojoba, and mixtures thereof.

4. The fuel additive package of claim 1, further comprising at least one material selected from the group consisting of organic peroxy esters, corrosion inhibitors, antioxidants, anti-rust agents, detergents and dispersants, lubricity agents, demulsifiers, dyes, pour point depressants, cold flow improvers, inert diluents, biocides, antistatic additives, drag reducing agents, dehazers, anti-icing additives, antiknock additives, anti-valve-seat recession additives, lubricity additives, friction improving additives, pour point depressants, cold flow improvers, fuel economy additives, octane improvers, cetane improvers, combustion improvers, a manganese source and other metal-containing ignition improvers.

5. A fuel detergent additive package for use in a fuel to reduce intake valve deposit formation and combustion chamber deposit formation comprising a biodegradable carrier oil derived from at least one plant source which undergoes at least esterification such that the biodegradable carrier oil has a noack volatility of less than or equal to about 50 wt. %, a pour point of less than or equal to about 0° C., a viscosity index of greater than or equal to about 85, a sulfur concentration of less than or equal to about 50 ppm, and a Penn State Microoxidation deposit weight of less than 5%;

a detergent comprising at least one member selected from the group consisting of (i) fuel-soluble salts, amides, imides, oxazolines and esters, or mixtures thereof of long chain aliphatic hydrocarbon-substituted dicarboxylic acids or their anhydrides; (ii) polyetheramines; (iii) long chain aliphatic hydrocarbons having an amine or a polyamine attached directly thereto; and (iv) Mannich condensation products formed by condensing a long chain aliphatic hydrocarbon-substituted phenol or cresol with an aldehyde, and an amine; and wherein the plant source comprises at least one plant source selected from the group consisting of corn grain, palm, canola, jatropha, soy bean oil, castor oil, rape seed, jojoba, and mixtures thereof.

6. A fuel detergent additive package for use in a fuel to reduce intake valve deposit formation and combustion chamber deposit formation comprising a biodegradable carrier oil derived from at least one plant source which undergoes at least functionalization of carbon-carbon double bonds such that the biodegradable carrier oil has a noack volatility of less than or equal to about 50 wt. %, a pour point of less than or equal to about 0° C., a viscosity index of greater than or equal to about 85, a sulfur concentration of less than or equal to about 50 ppm, and a Penn State Microoxidation deposit weight of less than 5%;

a detergent comprising at least one member selected from the group consisting of (i) fuel-soluble salts, amides, imides, oxazolines and esters, or mixtures thereof of long chain aliphatic hydrocarbon-substituted dicarboxylic acids or their anhydrides; (ii) polyetheramines; (iii) long chain aliphatic hydrocarbons having an amine or a polyamine attached directly thereto; and (iv) Mannich condensation products formed by condensing a long chain aliphatic hydrocarbon-substituted phenol or cresol with an aldehyde, and an amine; and wherein the plant source comprises at least one plant source selected from the group consisting of corn grain, palm, canola, jatropha, soy bean oil, castor oil, rape seed, jojoba, and mixtures thereof.

7. A fuel detergent additive package for use in a fuel to reduce intake valve deposit formation and combustion chamber deposit formation comprising a biodegradable carrier oil derived from at least one plant source having a noack volatility of less than or equal to about 50 wt. %, a pour point of less than or equal to about 0° C., a viscosity index of greater than or equal to about 85, a sulfur concentration of less than or equal to about 50 ppm, and a Penn State Microoxidation deposit weight of less than 5%;

a detergent comprising at least one member selected from the group consisting of (i) fuel-soluble salts, amides, imides, oxazolines and esters, or mixtures thereof of long chain aliphatic hydrocarbon-substituted dicarboxylic acids or their anhydrides; (ii) polyetheramines; (iii) long chain aliphatic hydrocarbons having an amine or a polyamine attached directly thereto; and (iv) Mannich condensation products formed by condensing a long chain aliphatic hydrocarbon-substituted phenol or cresol with an aldehyde, and an amine; and wherein the plant source comprises at least one plant source selected from the group consisting of corn grain, palm, canola, jatropha, soy bean oil, castor oil, rape seed, jojoba, and mixtures thereof.

\* \* \* \* \*